(12) United States Patent
Tomomatsu

(10) Patent No.: US 7,365,868 B2
(45) Date of Patent: Apr. 29, 2008

(54) INFORMATION PROCESSING APPARATUS, METHOD OF CONTROLLING PRINTING, COMPUTER PROGRAM, AND PRINTING SYSTEM

(75) Inventor: Yoshiaki Tomomatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 10/658,024

(22) Filed: Sep. 8, 2003

(65) Prior Publication Data
US 2004/0105114 A1 Jun. 3, 2004

(30) Foreign Application Priority Data
Sep. 9, 2002 (JP) .............................. 2002/262777
Jul. 8, 2003 (JP) .............................. 2003/193914

(51) Int. Cl.
*G06K 15/00* (2006.01)
*H04N 1/00* (2006.01)
(52) U.S. Cl. ....................................... 358/1.13; 358/1.1
(58) Field of Classification Search ............... 358/1.15, 358/1.13, 1.16, 2.1, 1.4, 1.5, 501, 1.17, 1.18, 358/1.14, 1.1; 347/2, 3, 129, 181; 399/5, 399/46, 150, 151; 382/304
See application file for complete search history.

(56) References Cited

U.S. PATENT DOCUMENTS 6,407,822 B1 * 6/2002 Ueda ........................ 358/1.15

2002/0044300 A1 * 4/2002 Oyanagi ..................... 358/1.15

FOREIGN PATENT DOCUMENTS

EP         1102466 A3    8/2003
JP       2001-144940 A   5/2001

* cited by examiner

*Primary Examiner*—Gabriel Garcia
(74) *Attorney, Agent, or Firm*—Canon U.S.A., Inc., IP Division

(57) ABSTRACT

In order to reduce the total time needed to print data produced by application software, producing of data and printing of the data are performed in parallel. In the parallel processing mode, the application software outputs data part by part in the same order as the order in which the data is printed by a printer on printing paper in a printing direction, that is, in a direction from the top to the bottom of the page. A printer driver declares to an OS (Operating System) that the OS should perform processing in an unbanding mode, and banding is performed by the printer driver. In the parallel processing mode, data of an area is printed when data of a next area is being scanned, and thus the total time from the start of a copying process to the end of printing is reduced.

21 Claims, 12 Drawing Sheets

FIG. 3

| HAPPY NEW YEAR! | ~BAND 1 |

| THANK YOU FOR EVERYTHING YOU DID LAST YEAR. TAKE CARE OF YOURSELF AND | ~BAND 2 |

JANUARY 1, 2002  ~BAND 3

~BAND 4

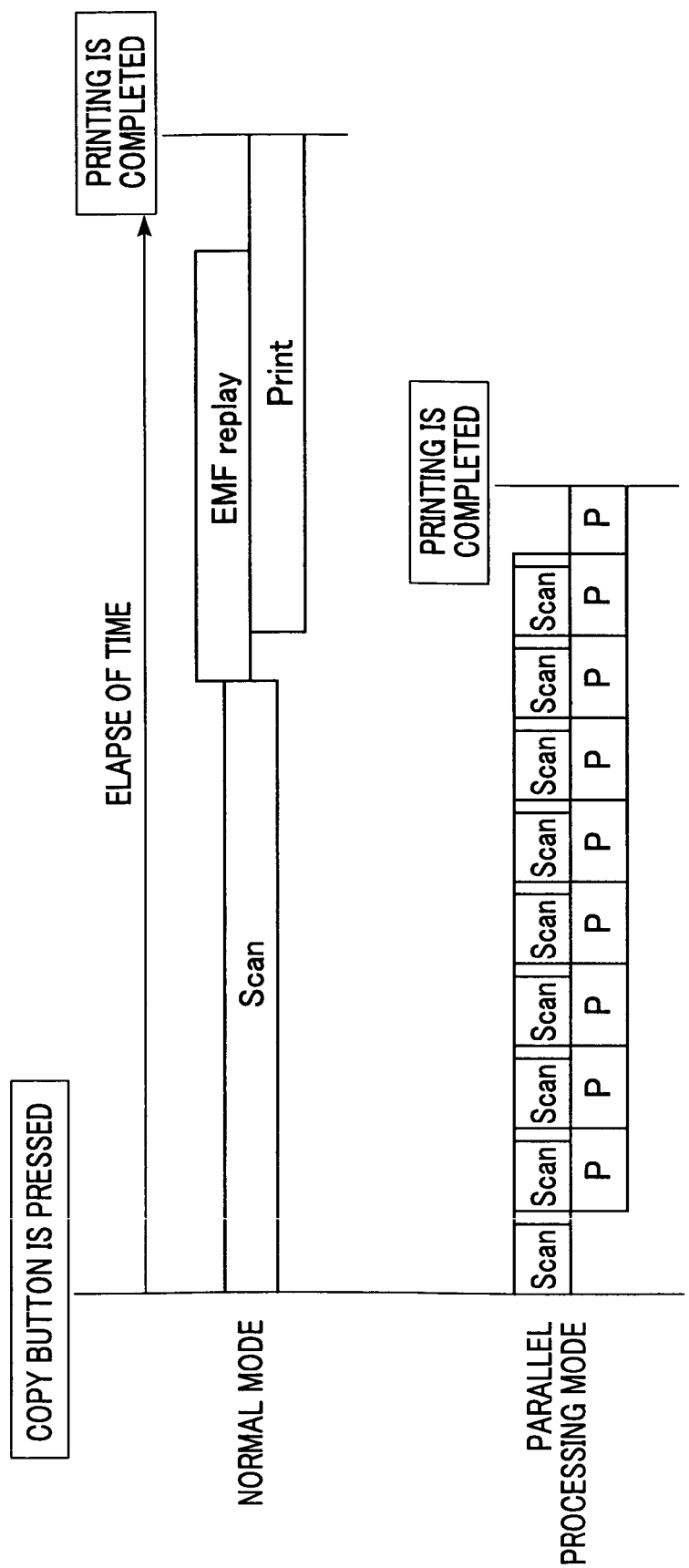

FIG. 12

COPY

PAPER SIZE : A4

NUMBER OF COPIES : 1

PRINTER : Canon PIXUS 550i  [PROPERTY]

PAPER TYPE : NORMAL PAPER

☑ PERFORM SCANNING AND PRINTING IN PARALLEL

[RESET INTO DEFAULT SETTING]   [APPLY]   [CANCEL]   ◇ SCAN

INFORMATION PROCESSING APPARATUS, METHOD OF CONTROLLING PRINTING, COMPUTER PROGRAM, AND PRINTING SYSTEM

BACKGROUND OF THE INVENTION

1. Field of the Invention

The present invention relates to a printing system, an information processing apparatus, a printing method, a computer program and a computer-readable storage medium, for converting image data of characters, graphical images, and/or the like generated by application software into raster image data and transmitting the resultant raster image data to a printer.

2. Description of the Related Art

In recent years, continuous reductions in prices of color printers and scanners have been achieved. This has made it possible to easily copy a color document using a color printer and a scanner connected to a computer.

In general, when copying is performed using a scanner and a color printer connected to a computer, application software running on the computer reads image data from the scanner via a scanner driver and temporarily stores the image data in the form of a file on the computer. Thereafter, if a user specifies the file and issues a print command to print the specified file, the application software outputs the image data to the color printer via the printer driver.

In many cases, Microsoft Windows (R) is used as an OS (Operating System) of a computer. When Microsoft Windows is used as an OS, printing of data output from the application software is not started, until one page of data has been spooled and the one page of data has been output to the printer driver. In a case in which the printer has the capability of handling a page description language, the printer stores supplied print data in a memory disposed in the printer, and the printer starts printing when full one page of print data has been obtained in the memory. In this case, data described in the page description language may be supplied part by part in an arbitrary order. In contrast, in a printer that performs printing on the basis of raster data (bitmap data), printing is generally started before full one page of print data is obtained. Therefore, it is required that the computer should sequentially supply print data part by part in the same order as the order in which the data is printed starting at the top of paper along a printing direction. To meet this requirement, the printer driver has to output raster data in such a manner that one page of print data is spooled and the print data is rearranged so that the data is output in the same order as the order in which printing is performed on paper in the printing direction. In the conventional technique, as described above, the process of reading image data via the scanner driver and the process of outputting image data via the printer driver are performed separately (refer to, for example, Japanese Patent Laid-Open No. 2001-144940).

However, performing separately reading image data from the scanner and outputting image data to the printer results in an increase in the total time from accepting a copy start command issued by a user to the end of printing.

SUMMARY OF THE INVENTION

In view of the above, an object of the present invention is to provide a technique of, in response to a print request issued by an application to a printer driver, performing outputting image data from the application and printing by a printer driver in parallel thereby reducing the total time from the start of the process to the end of printing.

To achieve the above object, the present invention provides a print control method of, in an information processing apparatus in which application software and a printer driver are installed, controlling a printing process, comprising an output step in which the application software outputs one page of data part by part in the same order as the order in which the data is printed on printing paper, a conversion step in which the printer driver converts the input data into print data without spooling one page of the data and outputs the resultant print data to an image output device, and a parallel processing step of performing the output step and the conversion step in parallel.

The present invention also provides an information processing apparatus in which application software and a printer driver are installed, comprising output means used by the application software to output one page of data part by part in the same order as the order in which the data is printed on printing paper in a printing direction, conversion means used by the printer driver to convert the input data into print data without spooling one page of data and to output the resultant print data to an image output device, and parallel processing means for performing the processes by the output means and the conversion means.

The present invention also provides a printing control program for use in an information processing apparatus in which application software and a printer driver are installed, comprising an output step in which the application software outputs one page of data part by part in the same order as the order in which the data is printed on printing paper in a printing direction, a conversion step in which the printer driver converts the input data into print data without spooling one page of the data and outputs the resultant print data to an image output device, and a parallel processing step of performing the output step and the conversion step in parallel.

Further objects, features and advantages of the present invention will become apparent from the following description of the preferred embodiments with reference to the attached drawings.

BRIEF DESCRIPTION OF THE DRAWINGS

FIG. 3 is a diagram showing an example of a manner in which print data is divided into bands.

FIG. 4 is a diagram showing times spent by the scanner in scanning and by the printer in printing.

FIG. 12 is a user interface used to set the application software so as to enable or disable the parallel processing mode.

DESCRIPTION OF THE PREFERRED EMBODIMENTS

Referring to the attached drawings, embodiments of a printing system, an information processing apparatus, a printing method, a computer program, and a computer-readable storage medium according to the present invention are described below.

Figure 1:
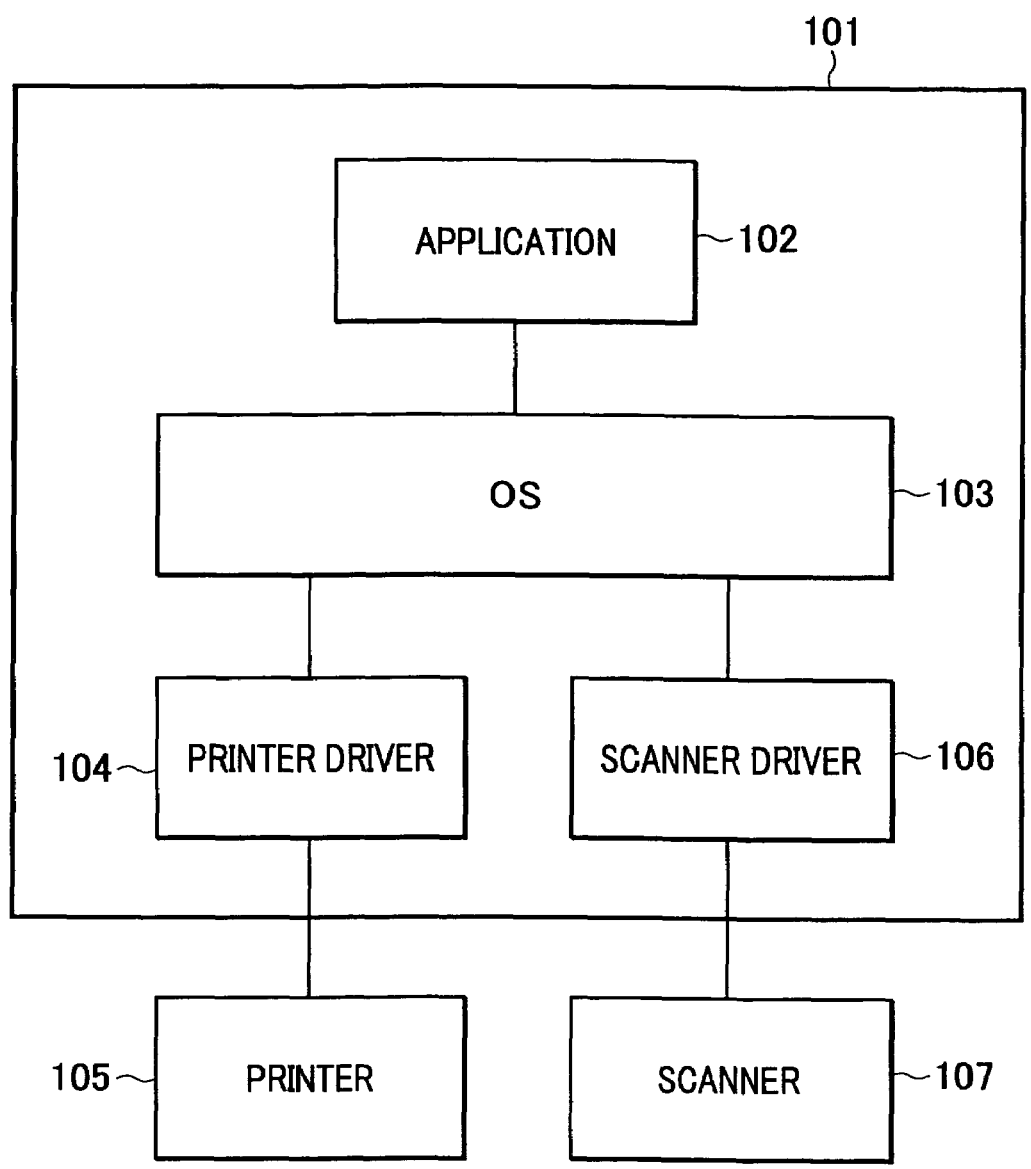
FIG. 1 is a functional block diagram of a print system according to an embodiment of the present invention.

FIG. 1 is a functional block diagram of a printing system according to an embodiment of the present invention. For example, the printing system includes a printer 105, a scanner 107, and a common type of personal computer 101 on which Microsoft Windows(R) or the like is installed as a OS (operating system, which functions as basic software) and arbitrary application software (hereinafter referred to simply as an application) 102 having the capability of printing wherein the printer 105 and the scanner 107 are connected to the personal computer 101.

The application 102 receives image data from the scanner 107 by using the scanner driver 106 via the OS 103 and outputs the image data to the printer 105 by using the printer driver 104.

In general, as in the conventional technique described earlier, it takes a long time for the scanner driver 106 to acquire image data from the scanner 107 and for the printer driver 104 to generate print data to be used by the printer 105. In the present invention, to avoid the above problem, inputting image data from the scanner 107 and printing by the printer 105 are performed in parallel thereby making it possible to perform copying at a high speed.

Even if the application 102 outputs image data to be used by the printer 105, no data is supplied from the OS 103 to the printer driver 104 until one page of data has been generated via the following processes:

1-1) Spooling performed by the OS, and
1-2) Processes performed by the application programming interface (API) of the Microsoft Windows (R), and thus printing is started after one page of an image has been scanned.

To make it possible to perform printing in the parallel processing mode, it is needed to solve the problems associated with spooling by the OS and the processes performed by the API, as described below.

1-1) Spooling by the OS

The OS 103 has the capability of performing printing in a background mode that allows the application 102 to start a next process before printing of data requested by the application 102 is completed. In the background mode, the OS 103 spools data in the form of drawing commands received from the application 102 into an EMF (Enhanced Meta File) thereby making it possible for the application 102 to start a next process. While the application 102 is performing the next process, the OS 103 outputs the spooled EMF data to the printer driver 104 to perform printing.

Setting associated with EMF spooling is possible for each printer driver 104. A user may switch the setting associated with EMF spooling, or the printer driver 104 may disable the EMF spooling. However, in general, the EMF spooling is set to be enabled when the printer driver 104 is installed, and the EMF spooling is maintained in the enabled state.

EMF data in a spool file is also used by the OS 103 in various printing modes, such as a reversal mode in which printing is performed starting from a last page, and a N-up mode in which a plurality of pages are printed on a single sheet. Therefore, even when the capability of printing in the background mode is unnecessary, if the EMF spooling is disabled by a user or the printer driver 104, various printing modes which need EMF data, such as the reversal mode and the N-up mode, are also disabled.

To avoid the above problem, the EMF spooling is disabled by the printer driver 104 in response to a command issued by the scanner application only when printing and scanning by the scanner 107 are performed in parallel, thereby making it possible to perform scanning and printing in parallel without requiring a user to perform an additional operation. When a user specifies that printing should be performed in the reverse mode or the N-up mode that needs EMF spooling, the parallel processing may be automatically disabled.

1-2) Process Performed by the API of Windows(R)

Figure 2:
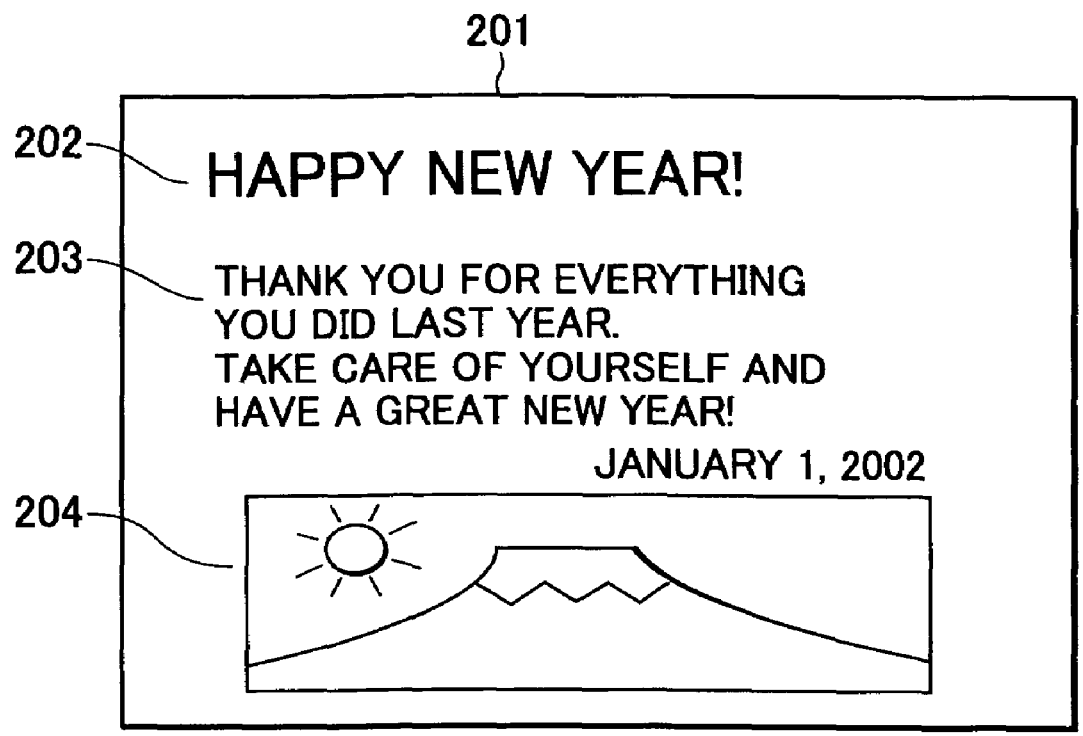
FIG. 2 is a diagram showing an example of print data supplied from application software.

The specifications of the API of Windows(R) allow the application 102 to output print data within one page part by part in an arbitrary order. As a result, printing cannot be started until a page end command is issued by the application 102. For example, when data shown in FIG. 2 is printed, the application 102 sequentially performs the following steps in the same order as listed below.

1. Outputting a page start command
2. Outputting bitmap data of a background image 201 (a faint color pattern is drawn, although it is not shown in FIG. 2)
3. Outputting data of an illustration 204 in a bottom area
4. Outputting data of a character string "Happy New Year!" 202
5. Outputting data of a character string "Thank you . . . , Jan. 1, 2002" 203
6. Outputting a page end command As described above, in the specifications of the API of Windows(R), because it is allowed to first output data of a background image and then output data of a character string or the like which is to be superimposed on the background image, print data is not finally determined for all points until the page end command is issued and thus printing cannot be started until the page end command is issued.

In the printing system using Windows(R), in view of the above, printing is performed as follows.

2-1) Printing Using a Banding Driver

In a case in which image data of characters and/or a graphics image is generated by the application 102 and output in the form of raster image data to the printer 105, the image data is first generated on a virtual page memory in the personal computer 101 serving as a host computer, and then the image data is output to the printer 105.

In the above process, in order to increase the memory efficiency of the host computer, the virtual page memory is divided into a plurality of bands. In response to a request for image data from the OS 103, image data is generated on the band memory on a band-by-band basis. If image data for a whole band is generated, the data generated on the band memory is output to the printer under the control of the OS 103.

FIG. 3 shows a manner in which image data is generated on the band-by-band basis. The OS 103 extracts drawing commands belonging to respective bands and supplies the extracted drawing commands to the printer driver 104. More specifically, the OS 103 retains one page of drawing commands, and the OS 103 requests the printer driver 104 to output image data on the band-by-band basis. For example, in the case of band 1, the OS 103 requests the printer driver 104 to output bitmap data of the background image 201 (a faint color pattern is drawn as the background image, although it is not shown in FIG. 3) in band 1 and a character string "Happy New Year!" 202.

In response to receiving the request, the printer driver 104 supplies only drawing commands belonging to band 1 to the printer 105. After completion of supplying the drawing commands belonging to bands 1, the printer driver 104 notifies the OS 103 of the completion of the process and the band location. In response, the OS 103 sequentially supplies data of following bands 2, 3, . . . , to the printer driver 104 band by band in the similar manner to band 1.

In the case in which the banding driver is used, as described above, the OS 103 first spools (acquires and retains) one page of data and then outputs data to the printer driver 104 on the band-by-band basis.

2-2) Printing Using an Unbanding Driver

In a case in which the printer 105 has a page memory or a similar memory capable of storing one page of data, the printer 105 can retain one page of image data. In a case in which the printer driver 104 has a spooling capability, the printer driver 104 can retain one page of image data. In either case, the printer driver 104 informs the OS 103 that the printer driver 104 is capable of handling image data in the unbending mode.

In the case in which the printer driver 104 has the capability of handling image data in the unbanding mode, if the EMF spooling is set to be disabled, the OS 103 directly transfers the output from the application 102 to the printer driver 104 and the printer 105. The printer driver 104 and the printer 105 receive the data and retain the received data until the API of the Windows(R) determines the final data. If a page end command is received, the printer driver 104 and the printer 105 start printing.

As described above, to make it possible to print image data supplied from any application via the API of Windows (R), printing cannot be started until one full page of image data is acquired.

Thus, regardless of whether the printer driver is of the banding type or unbanding type, it is required to spool one page of data in the OS or the printer driver. As a result, printing needs a long time.

To avoid the above problem, the printer driver 104 has a parallel processing mode in which processing is performed as follows.

The application 102 outputs data part by part in the order corresponding to the direction in which printing paper is fed by the printer 105, that is, in the order corresponding to the direction from the top to the bottom of one page.

The parallel processing mode can be specified by the application 102 that knows the above-described rule.

The printer driver 104 declares to the OS 103 that the OS 102 should handle data in the unbanding mode, and banding is performed by the printer driver 104.

FIG. 4 shows times spent by the scanner 107 in scanning (denoted by "Scan") and times spent by the printer 105 in printing (denoted by "Print"). In the normal mode, after completion of scanning by the scanner 107, the OS 103 requests the printer 105 to print data spooled in an EMF spool file. In response, the printer 105 starts printing. In contrast, in the parallel processing mode, data obtained by scanning is printed when a next area is being scanned, and thus the total processing time from the start of scanning to the end of printing can be reduced.

Figure 6:
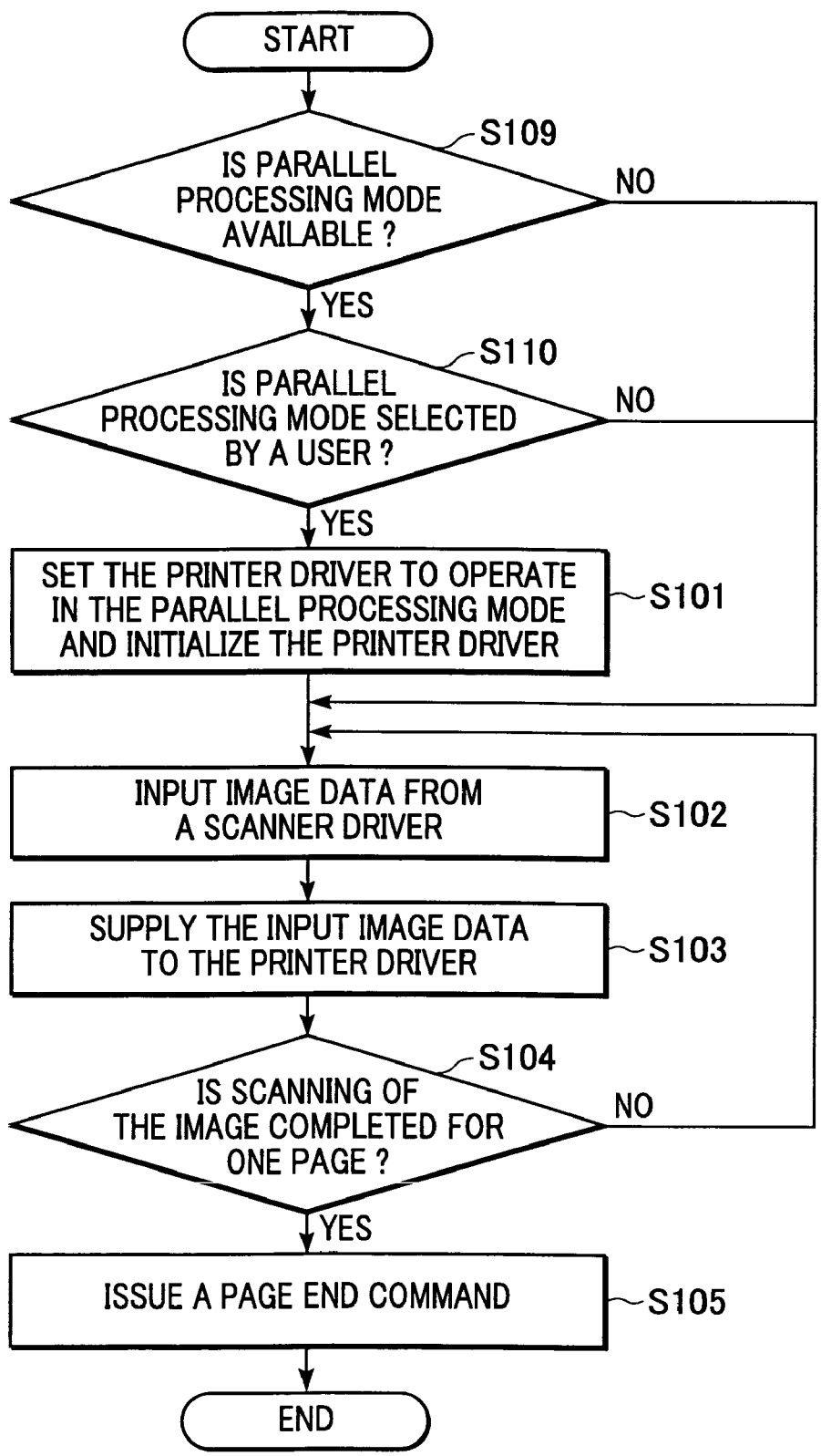
FIG. 6 is a flow chart showing a process performed by the application software.
Figure 7:
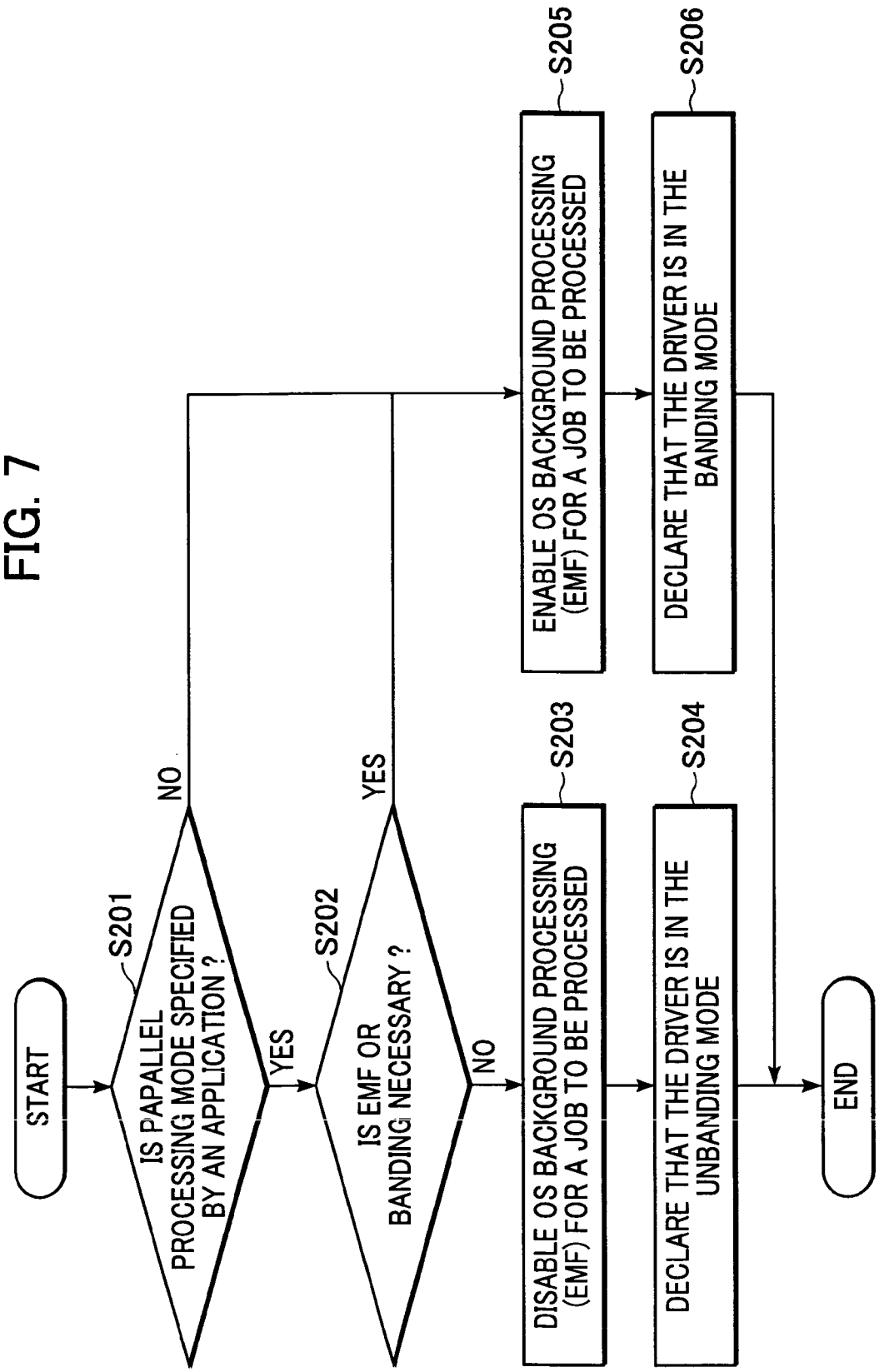
FIG. 7 is a flow chart showing an initialization process performed by the printer driver.
Figure 8:
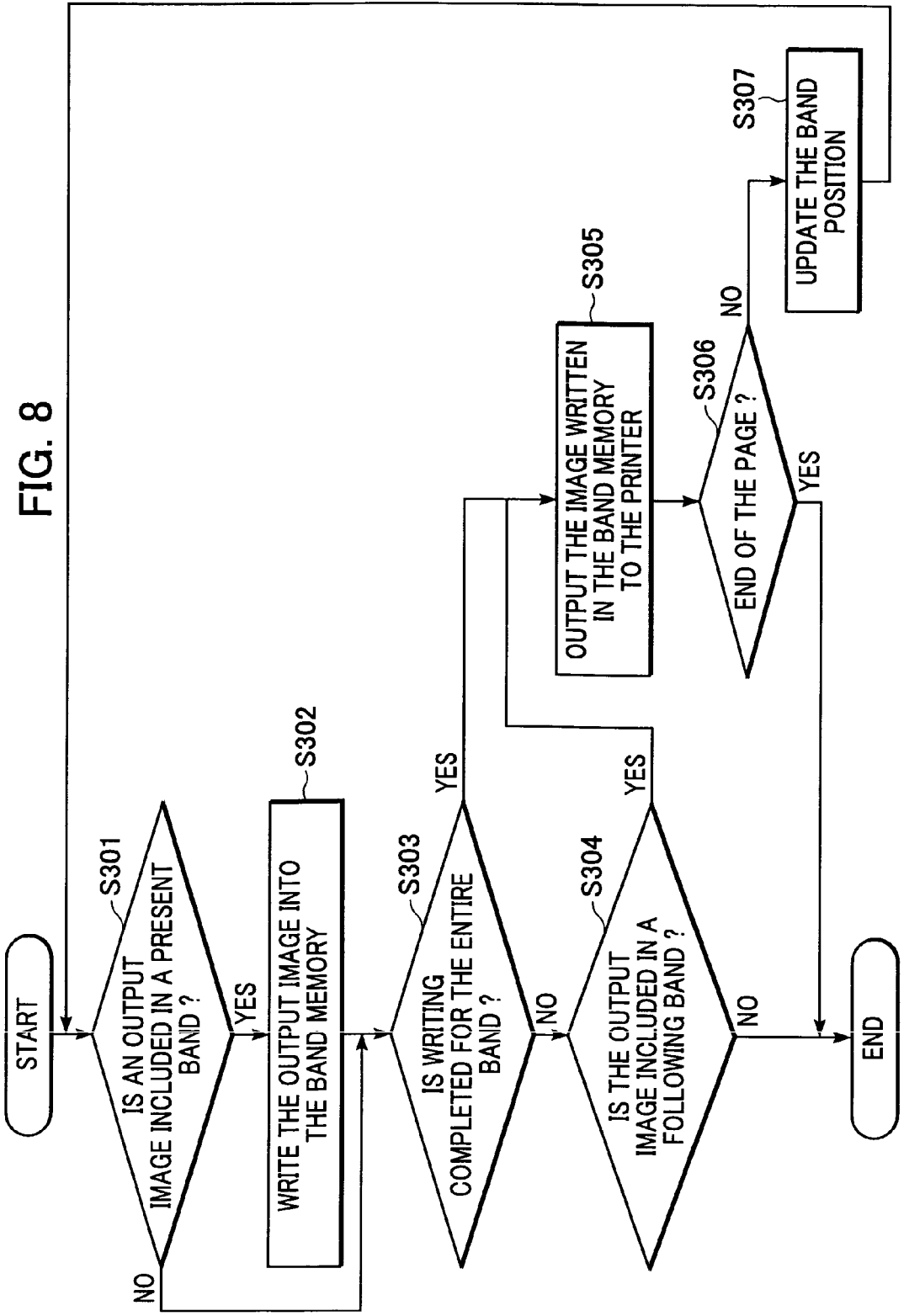
FIG. 8 is a flow chart showing a printing process performed by the printer driver.
Figure 9:
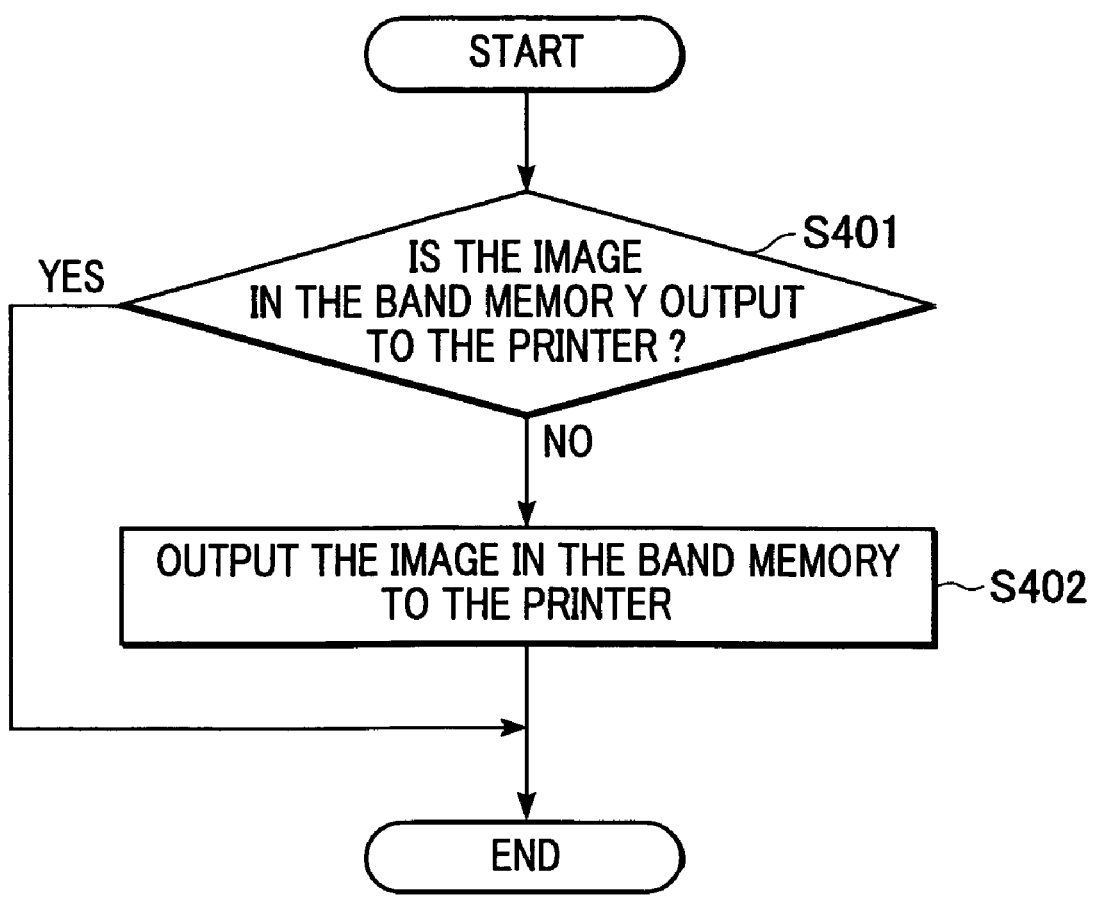
FIG. 9 is a flow chart showing a page end process performed by the printer driver.
Figure 10:
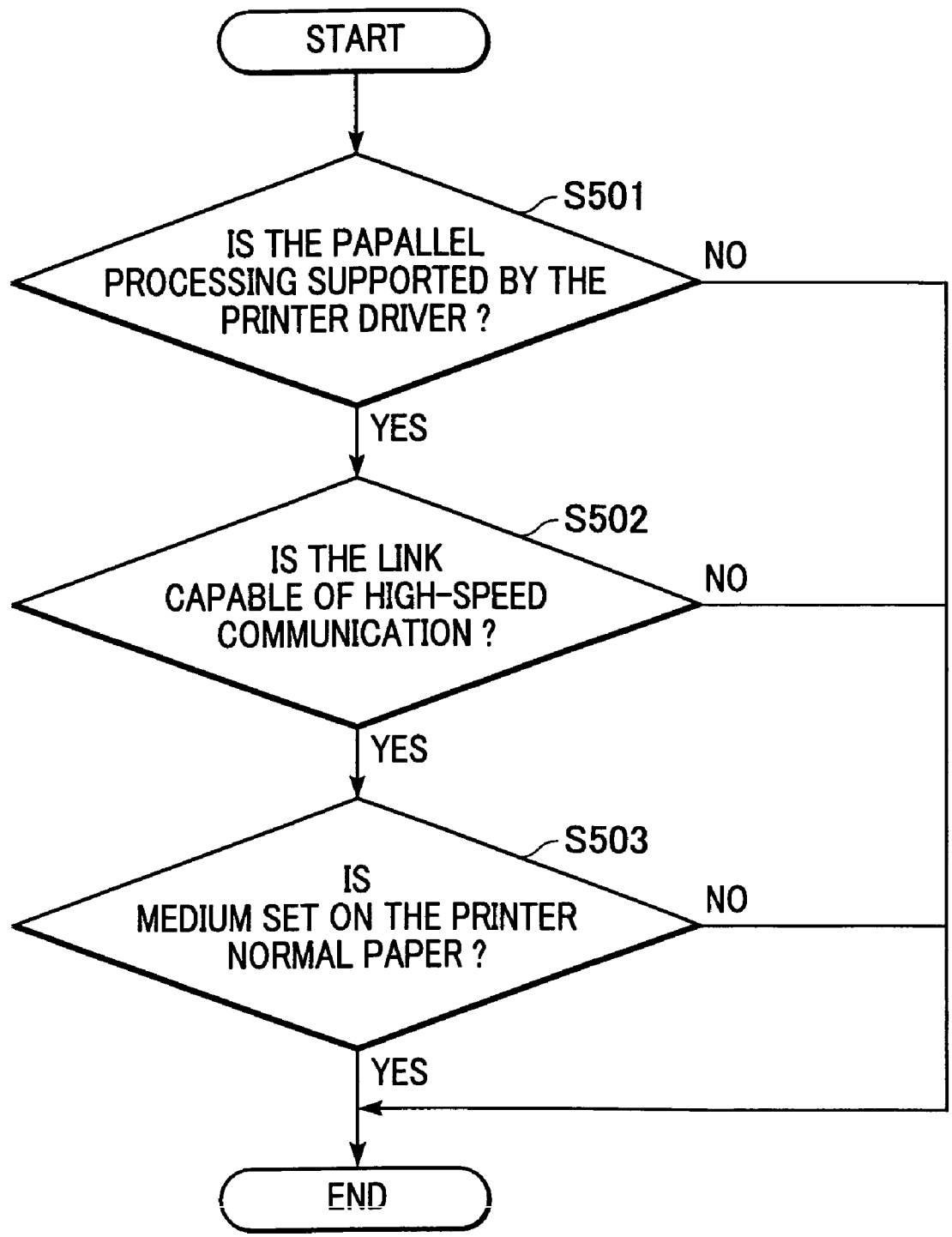
FIG. 10 is a flow chart showing a process of determining whether parallel processing is possible.

The processing flows according to the present embodiment are described below with reference to FIGS. 6 to 10, wherein FIG. 6 shows a process performed by the application 102, FIG. 7 shows an initialization process performed by the printer driver 104, FIG. 8 shows a printing process performed by the printer driver 104, FIG. 9 shows a page end process performed by the printer driver 104, and FIG. 10 shows a process of determining whether the parallel processing is possible.

Figure 11:
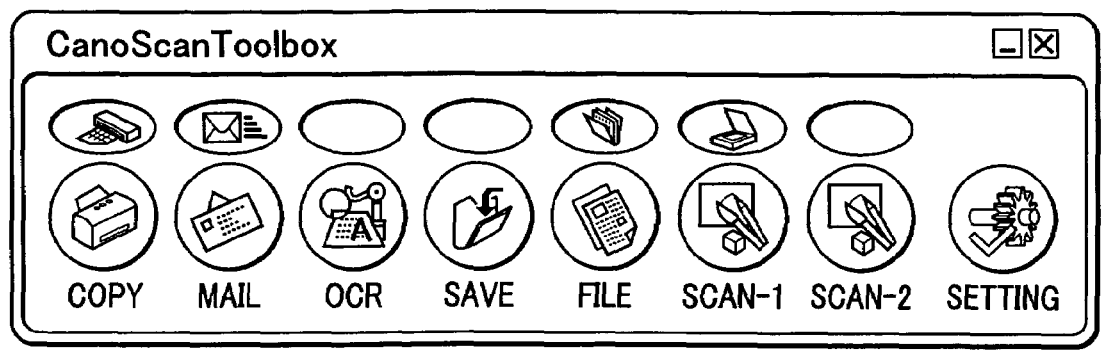
FIG. 11 is a diagram showing a user interface used to issue a copy command to the application software.

FIG. 11 shows a user interface that is displayed when the application 102 is started. In the user interface shown in FIG. 11, a COPY key has a special function according to the present invention. If a user presses this COPY key, copying is started in the parallel processing mode in which reading data from the scanner and outputting data to the printer are performed in parallel. In addition to the copying function of scanning an image and printing the image using the printer 105, the application 102 also has a mailing function of transmitting an image obtained by scanning via the Internet, and a saving function of saving image data in a file. If the user presses the COPY key shown in FIG. 11, the application 102 first determines whether the parallel processing is possible (step S109 in FIG. 6).

FIG. 10 shows the details of the process of determining whether the parallel processing is possible.

First, via the extended API (Application Programming Interface), the application 102 makes an inquiry about the capabilities of the printer driver 104 and determines whether the printer driver 104 supports the parallel processing. In a case in which the OS has a capability of making the inquiry about the capabilities of the printer driver 104 in response to a request from the application 102, the inquiry is made via the OS. However, if the OS does not have such a capability, the application sends an inquiry directly to the printer driver 104 without using the OS (step S501 in FIG. 10). Some printer drivers do not support the parallel processing mode, although some printer drivers support the parallel processing mode. If the parallel processing mode is supported, the printer driver notifies the application 102 via the extended API that the printer driver supports the parallel processing mode.

If it is determined in step S501 that the parallel processing is supported, it is further determined whether high-speed communication is available.

In the parallel processing mode, a heavy processing load is imposed on a CPU to concurrently perform inputting of image data from the scanner 107 and outputting of image data to the printer 105. In general, the scanner 107 and the printer 105 are connected to the personal computer 101 via USB communication lines. In a case in which data communication via different USB ports of the personal computer 101 is controlled by a single hardware chip, a very large processing load on the hardware chip can occur, which can cause a delay in transmitting/receiving data. If there is a delay in receiving data from the scanner 107, a data reading carriage of the scanner 107 stops, and it becomes necessary to perform rereading. The above problem can be avoided if the scanner 107 or the printer 105 is connected to the personal computer 101 via a high-speed communication line such as a USB 2.0 communication line, which is widely used in state-of-the-art personal computers. Thus, the application 102 determines whether high-speed communication with the scanner 107 or the printer 105 is possible by determining whether the scanner 107 or the printer 105 is connected via a USB 2.0 interface. The capability of high-speed communication may be determined for both or one of the scanner 107 and the printer 105. In the case in which the capability of high-speed communication is determined for only one of the scanner 107 and the printer 105, it is desirable to determine the capability of the scanner 107, because data transmitted from the scanner 107 has a greater data size than data transmitted to the printer 105. In a case in which communication is controlled separately for the scanner 107 and the printer 105 by using different chips, the communication capability may be regarded as being sufficiently high, even if the communication speed is not very high (step S502).

If it is determined that the personal computer 101 and the scanner 107 are connected via a high-speed communication line, then the application 102 further determines, in the next step S503, whether plain paper is used as media on which printing is performed by the printer 105, by making an inquiry to the printer driver 104.

In recent years, the image quality of printers has been improved, and there is an increasing need for printing high-quality digital images. If commercially available high-end printing paper is used, it is possible to print very high-quality image similar to that obtained by silver photography. However, printing on such high-end printing paper needs very complicated image processing, which results in an increase in load imposed on a CPU. The increase in load often causes a delay in receiving image data from the scanner 107 and also causes a break in a printing operation of the printer 105. Such a break in the printing operation causes ink to dry, which results in a break in continuity of image tone and thus degradation in image quality. To avoid the above problem, the determination is made as to whether plain paper is used as printing media, and the parallel processing is performed only when plain paper is used (step S503).

If it is determined in step S503 that plain paper is used, copying in the parallel processing mode is started. Alternatively, a user may determine whether copying is performed in the parallel processing mode. In order to make it possible for the user to specify whether copying is performed in the parallel processing mode, the user interface (FIG. 11) for setting the printer driver 104 may include a button or the like for specifying whether copying is performed in the parallel processing mode, wherein the button is enabled if it is determined in step S109 of FIG. 6 (steps S501, S502, and S503 in FIG. 10) that the parallel processing is possible, and it is determined whether copying is performed in the parallel processing mode in accordance with the setting performed by the user (step S110 in FIG. 6).

Thereafter, copying is actually started. In the case in which it is determined in step S109 of FIG. 6 (steps S501, S502, and S503 in FIG. 10) that the parallel processing mode is not employed, or in the case in which the user determines in step S110 of FIG. 6 that the parallel processing mode is not employed, the processing flow jumps to step S102 of FIG. 6, without performing step S101 of FIG. 6 in which otherwise the printer driver 104 is set so as to operate in the parallel processing mode.

However, if the user determines that the parallel processing mode is employed, the application 102 requests the printer driver 104 to operate in the parallel processing mode (step S101 in FIG. 6).

In the parallel processing mode, as described earlier, it is required that data should be output in a particular order. Therefore, only when printing is performed in the particular order, the application 102 requests the printer driver 104 to operate in the parallel processing mode. This is to prevent printing from being performed incorrectly which would otherwise occur if printing is specified to be performed in the parallel processing mode by a user or an application which does not know that data should be correctly output in the particular order and thus if data is output in a wrong order from the application 102. For example, in the case of data shown in FIG. 2, if the data is directly printed in the parallel processing mode, the printing position reaches the end of the page when the whole bitmap data of the background 201 has been output from the application 102, and it becomes impossible to print following data including character data or the like. To avoid the above problem, it is desirable that setting can be made in a special manner that is not included in the specifications of Windows(R).

For example, the printer driver 104 is formed so as to have a special function, and the application 102 adapted to the parallel processing performs setting using the special function.

The process performed by the printer driver 104 in response to an initialization request is described below with reference to FIG. 7. First, the printer driver 104 determines whether the parallel processing mode is requested by the application 102 (step S201).

If the answer in decision step S201 is yes, it is further determined whether the driver is correctly set so that the parallel processing is possible. In the parallel processing mode, EMF spooling is disabled, and banding is performed by the printer driver 104. However, the OS 103 realizes many functions using an EMF spool file, and those functions become impossible. For example, when the application 102 performs printing of a plurality of pages, the reverse mode, in which data of all pages is first spooled in an EMF spool file and then printing is performed in the reverse order starting from the last page, becomes unavailable. Functions that need banding also become unavailable.

In view of the above, when the user specifies that printing should be performed using a function that needs EMF spooling, printing is performed in the non-parallel processing mode so that the function specified by the user can be used. Thus, it is determined whether the current setting needs EMF spooling or banding (step S202). Depending on the specified function, printing may be performed in the parallel processing mode without using the specified function.

If the answer in step S202 is "no", the EMF processing is disabled for the job to be processed in order to enable the parallel processing mode (step S203). The disabling of the EMF processing is accomplished by setting a flag GCAPS_DONTJOURNAL in data DEVINFO returned to the OS 103, when the OS 103 performs initialization for each job (printing job requested by the application). The flag is effective only for the initialized job, and the flag does not influence following printing jobs.

Thereafter, it is declared to the OS 103 that processing should be performed in the unbanding mode (step S204). The printer driver 104 produces data serving as a virtual device referred to as Surface and returns the produced data Surface to the OS 103 in the initialization step. Surface can be specified as a banding driver by calling a function EngMarkBandingSurface in the OS 103. If the OS 103 receives Surface from the printer driver 104, the OS 103 handles Surface as a banding driver. On the other hand, if EngMarkBandingSurface is not called, processing is performed in the unbanding mode. In this specific case, it is required that processing is performed by the OS 103 in the unbanding mode, EngMarkBandingSurface is not called. This setting is also effective only for the present job to be processed, and the setting is not effective for following printing jobs.

If the answer in step S201 is "no" or the answer in step S202 is "yes", that is, if the application 102 does not specify the parallel processing mode or if the printer driver 104 disables the parallel processing mode although the parallel processing mode is requested because EMF spooling or banding is necessary, the flag GCAPS_DONTJOURNAL in DEVINFO is not set in the initialization performed by the OS 103 for the job (step S205), and DEVINFO is returned to the OS 103 after calling EngMarkBandingSurface to enable Surface (step S206), which are opposite to steps S203 and S204.

Referring again to FIG. 6, after completion of the initialization of the printer driver 104, the application 102 outputs image data acquired from the scanner 107 to the printer 105 in such a manner that one page of image data is divided into bands and image data is input and output repeatedly on the band-by-band basis. More specifically, the application 102 inputs one band of image data from the scanner 107 via the scanner driver 106 (step S102) and outputs the input one page of image data to the printer 105 via the printer driver 104 (step S103). This makes it possible for the printer 105 to print a band of image data when a next band of image data is being input from the scanner 107. The band size employed in the printing performed by the printer 105 may or may not be set to be equal to the band size employed by the printer driver 104.

The process performed by the printer driver 104 in response to an output request is described below with reference to FIG. 8. First, in step S301, it is determined whether the image data requested to be output is included in a band defined in the printer driver 104. In the printer driver 104, the band position is first at the top of the page, as with band 1 shown in FIG. 3. With advance in the printing process, the band position is changed in the downward direction to band 2, band 3, and so on. In the determination as to whether the image data is included in a band, the answer is "yes" if any part of the requested image data is included in the band memory.

If it is determined that the image data is included in the band, a part of image data included in the band is written into the band memory, that is, the image data to be output is scaled up or down depending on the printing area, and the resultant image data is written into the band memory (step S302).

Figure 5A:
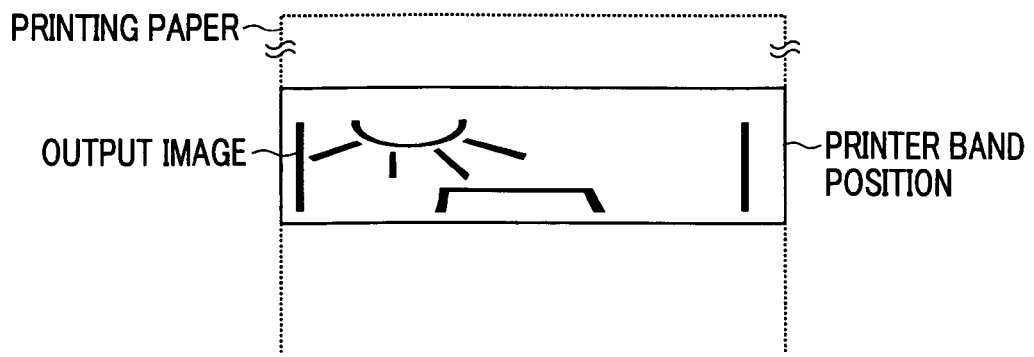
FIGS. 5A to 5C are diagrams showing positions, on printing paper, of printer bands handled by the printer driver.
Figure 5B:
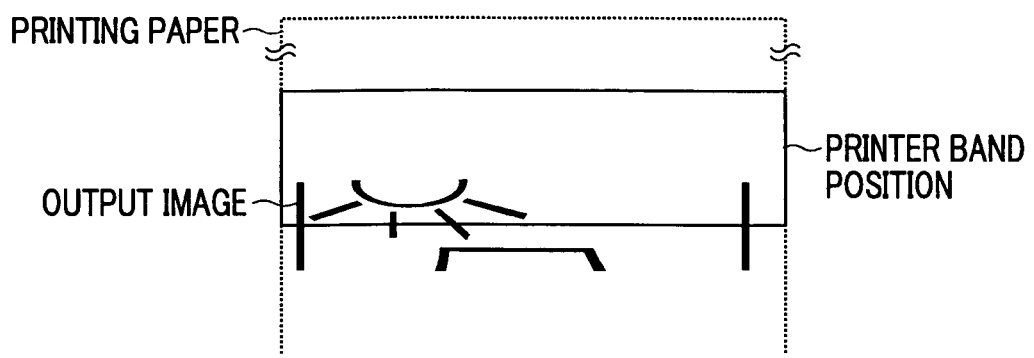
Figure 5C:
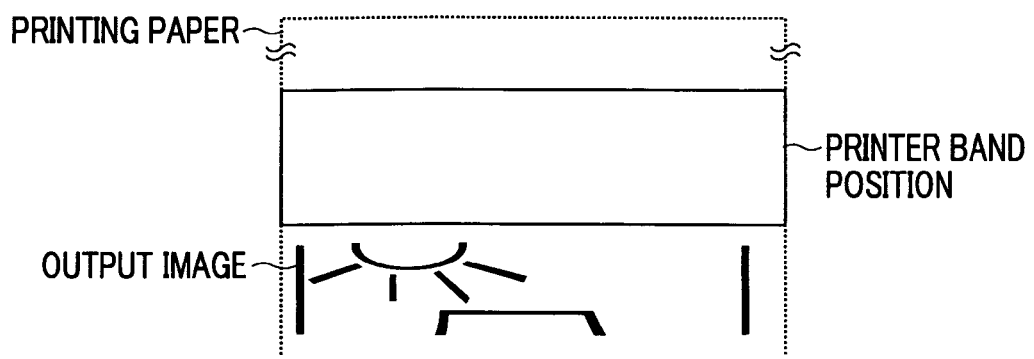

If the answer in step S301 is "no" or upon completion of step S302, the band position in the printer driver 104 relative to the output image is determined. FIGS. 5A to 5C are diagrams showing positions, on printing paper, of printer bands handled by the printer driver 104. FIG. 5A shows a case in which the whole output image is within the printer band, and FIG. 5B a case in which part of the output image is included in a next band. FIG. 5C shows a case in which the whole output image is in an outside area below the band. The bands are sequentially processed from the top to the bottom.

First, it is determined whether the whole image data has been written in the band memory (step S303 in FIG. 8). In the examples shown in FIGS. 5A to 5C, the answer is "yes" for the case shown in FIG. 5B in which the output image data is written on the lower edge of the band, but the answer is "no" for the cases shown in FIGS. 5A and 5C.

If the answer in step S303 is "no", it is further determined in step S304 whether the output image is included in a following band. In the case shown in FIG. 5C, the whole image is in an area below the lower edge of the band, and thus the answer is "yes", but the answer is "no" in the case shown in FIG. 5A in which there is no output image below the lower edge of the band.

If it is determined in step S304 that the output image is not included in the following band as is the case shown in FIG. 5A, the image data is not output to the printer 105, because there is a possibility that a further image write command for the present band memory is issued although the requested image has been written in the band memory. Thus, the process performed in step S103 of FIG. 6 by the printer driver 104 is completed.

On the other hand, if it is determined in step S303 that the output image has been written over the whole band as in the case shown in FIG. 5B, or if it is determined in step S304 that the image is also included in the following band as in the case shown in FIG. 5C, it can be concluded that a further request for outputting the image data in this band will not be issued, because, in the parallel processing mode, an image write command is issued by the application 102 in the order from the top to the bottom. Thus no further image write command for the band is issued after the image data has been written over the whole band or after an image write command for a following band has been issued. The image data written in the band memory is converted into data in the form of printer commands and output to the printer 105 (step S305).

Thereafter, in step S306 it is determined whether the band output in step S305 is the last band on the page. If it is determined the band is the last one, it is concluded that the outputting of image data is completed for the whole page, and thus the process performed by the printer driver 104 in step S103 of FIG. 6 is completed.

On the other hand, if the answer in step S306 is "no", that is, if it is determined that the outputting is not completed for all bands, the band position is changed to a next band position (step S307) and the process flow returns to step S301 to repeat step S301 and following steps.

Referring again to FIG. 6, the process performed by the application 102 after the completion of outputting image data to the printer driver 104 is described below. In order to repeatedly input image data from the scanner driver 106 and output the image data to the printer driver 104 until full one page of image data is processed, the application 102 determines, after the completion of outputting image data to the printer driver 104, whether scanning of image is completed for the entire one page (step S104).

If the answer in step S104 is "no", that is, if it is determined that the scanning is not completed for the entire one page, the process flow returns to step S102 to repeat step S102 and following steps. On the other hand, if the answer in step S104 is "yes", that is, if it is determined that the scanning is completed for the entire one page, the application 102 issues a page end command to the printer driver 104. Thus, the process performed by the application 102 is completed.

The process performed by the printer driver 104 in response to receiving the page end command is described below with reference to FIG. 9. The printer driver 104 has to output to the printer 105 the image data which has been written in the band memory but which has not yet been output to the printer 105. First, it is determined whether the image data currently stored in the band memory has been output to the printer 105 (step S401). This determination is required because there is a possibility that the image data, which has been output at last from the application 102 and written to the end of the band as is the case in FIGS. 5B and 5C, remains in the band memory after the image has been output in step S305 to the printer 105.

If the answer in step S401 is "yes", the process of the printer driver 104 is ended. On the other hand, if the answer in step S401 is "no", then in step S402, the image data written in the band memory is converted into data in the form of printer commands and output to the printer 105, as in step S305 of FIG. 8. Thus, the process performed by the printer driver 104 is completed.

Although in the embodiments described above, copying is performed using the scanner 107 and the printer 105, the present invention can also be advantageously employed when data received from another device or received via a network is printed, or when print data, which is generated by an application via complicated processing by spending a long time, is printed.

OTHER EMBODIMENTS

The objects of the present invention may also be achieved by supplying a software program code to a computer connected to a plurality of devices or to a computer in a system whereby the computer (CPU or MPU) in the system or the apparatus controls various devices in accordance with the program code thereby achieving the functions of any of the embodiments described above. This technique also falls within the scope of the present invention.

In this case, it should be understood that the program code read from the storage medium implements the functions of the invention and thus the program code falls within the scope of present invention. The program code may be transmitted via a transmission medium such as a communication medium (wireless or wired communication line such as an optical fiber) in a computer network system (using a network such as a LAN, WAN (such as the Internet), or a wireless communication network) designed to transmit information such as program information on a carrier signal.

Means for supplying the program code to a computer, such as a storage medium on which the program code is stored, also falls within the scope of the present invention. Specific examples of storage media that can be preferably employed in the present invention to store the program code include a floppy disk, a hard disk, an optical disk, a magneto-optical disk, a CD-ROM, a magnetic tape, a non-volatile memory card, and a ROM.

Furthermore, the scope of the present invention includes not only such a system in which the functions of any embodiment described above are implemented simply by executing a program code on a computer but also a system in which the functions of any embodiment described above are implemented by the program code in cooperation with a OS (operating system) on which the program runs or in cooperation with another application software.

Furthermore, the program code may be stored into a memory provided on an expansion board inserted into the computer or an expansion unit connected to the computer, and a part of or the whole of process may be executed by a CPU or the like provided on the expansion board or the expansion unit thereby realizing the functions according to the invention. This technique also falls within the scope of the invention.

As described above with reference to specific embodiments, the present invention makes it possible to reduce the total time needed to perform copying by performing inputting of image data from the scanner and printing of the image data by the printer in parallel. This is very useful especially in the case in which it takes a long time for application software to generate data to be output to the printer on the basis of image data acquired from the scanner.

The present invention also makes it possible to print image data at a high speed in response to a request issued by the application to the printer driver, by performing outputting image data from the application and printing by the printer driver in parallel within one page, thereby reducing the total time from the start of the process to the end of printing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print control method of, in an information processing apparatus in which application software and a printer driver are installed, controlling a printing process, wherein the information processing apparatus is connected to an image output device, the print control method comprising:

a first determination step of determining whether or not a transmission method between the image output device and the image processing apparatus is a predetermined transmission method;

a second determination step of determining whether or not printing paper, on which print data is printed by the image output device, is predetermined paper;

an output step in which the application software outputs one page of data part by part in the same order as the order in which the data is printed on the printing paper in a printing direction;

a conversion step in which the printer driver converts the input data into print data without spooling one page of the data and outputs the resultant print data to the image output device; and a control step of performing the output step and the conversion step in parallel when the transmission method is determined as the predetermined transmission method by the first determination step and the paper is determined as the predetermined paper by the second determination step, and of converting one page of data into the print data after the output of the one page of the data by the output step when the transmission method is not determined as the predetermined transmission method by the first determination step or the paper is not determined as the predetermined paper by the second determination step.

2. A print control method according to claim 1, further comprising a third determination step in which when a parallel processing mode is specified by the application software, it is determined whether the printer driver supports the parallel processing mode.

3. A print control method according to claim 1, wherein the determination step determines whether the information processing apparatus and the image output device are connected by USB 2.0.

4. A print control method according to claim 1, wherein the second determination step determines whether the print data is to be outputted on plain paper.

5. A print control method according to claim 1, further comprising a setting step in which, when the parallel processing step is performed, the printer driver disables spooling performed by basic software installed in the information processing apparatus.

6. A print control method according to claim 1, further comprising a positional relationship determination step in which the printer driver detects the positional relationship between data output from the application software and a band output by the image output device,
wherein data divided into bands is output to the image output device in accordance with the positional relationship detected in the positional relationship determination step.

7. A print control method according to claim 6, wherein when the application software outputs one page of data part by part in the same order as the order in which the data is printed on printing paper in a printing direction, the application software divides the one page of data into bands and outputs the data on a band-by-band basis.

8. An information processing apparatus in which application software and a printer driver are installed, wherein the information processing apparatus is connected to an image output device comprising:
a first determination unit configured to determine whether or not a transmission method between the image output device and the image processing apparatus is a predetermined transmission method;
a second determination unit configured to determine whether or not printing paper, on which print data is printed by the image output device, is predetermined paper;
an output unit configured to be used by the application software to output one page of data part by part in the same order as the order in which the data is printed on printing paper in a printing direction;
a conversion unit configured to be used by the printer driver to convert the input data into print data without spooling one page of data and to output the resultant print data to the image output device; and
a control unit configured to perform the parallel processes of the output unit and the conversion unit when the transmission method is determined as the predetermined transmission method by the first determination unit and the paper is determined as the predetermined paper by the second determination unit, and of converting one page of data into the print data after the output of the one page of the data by the output unit when the transmission method is not determined as the predetermined transmission method by the first determination unit or the paper is not determined as the predetermined paper by the second determination unit.

9. An information processing apparatus according to claim 8, further comprising a third determination unit configured to determine when a parallel processing mode is specified by the application software, determining whether the printer driver supports the parallel processing mode.

10. An information processing apparatus according to claim 8, further comprising a setting unit configured to set, when the parallel processing is performed by the control unit, disabling, by using the printer driver, a spooling capability of basic software installed in the information processing apparatus.

11. An information processing apparatus according to claim 8, further comprising a positional relationship detection unit configured to detect, by using the printer driver, the positional relationship between data output from the application software and a band output by the image output device,
wherein data divided into bands is output to the image output device in accordance with the positional relationship detected by the positional relationship detection means.

12. An information processing apparatus according to claim 11, wherein when the application software outputs one page of data part by part in the same order as the order in which the data is printed on printing paper in a printing direction, the application software divides the one page of data into bands and outputs the data on a band-by-band basis.

13. An information processing apparatus according to claim 8, wherein the first determination unit determines whether the information processing apparatus and the image output device are connected by USB 2.0.

14. An information processing apparatus according to claim 8, wherein the second determination unit determines whether the print data is to be outputted on plain paper.

15. A computer executable program stored on a computer readable medium, the computer-executable program for use in an information processing apparatus in which application software and a printer driver are installed, the computer-executable program comprising:
determining whether or not a transmission method between the image output device and the image processing apparatus is a predetermined transmission method;
determining whether or not printing paper, on which print data is printed by the image output device, is predetermined paper;
outputting by the application software, one page of data part by part in the same order as the order in which the data is printed on printing paper in a printing direction; and
converting, by the printer driver, the input data into print data without spooling one page of the data and outputs the resultant print data to an image output device,
wherein outputting one page of data part by part in the same order as the order in which data is printed on the printing paper in a printing direction and converting the input data into print data without spooling one page of the data and outputting the resultant print data to the image output device are performed in parallel,
wherein when the transmission method is determined as the predetermined transmission method and the paper is determined as the predetermined paper, and converting one page of data into the print data after outputting the one page of data when the transmission method is not determined as the predetermined transmission method or the paper is not determined as the predetermined paper.

16. A computer executable program stored on a computer readable medium according to claim 15, the computer-executable program further comprising determining, when a parallel processing mode is specified by the application software, whether the printer driver supports the parallel processing mode.

17. A computer executable program stored on a computer readable medium according to claim 15, the computer-executable program further comprising, disabling, by the printer driver, when the parallel processing step is performed, spooling performed by basic software installed in the information processing apparatus.

18. A computer executable program stored on a computer readable medium according to claim 15, the computer-executable program further comprising detecting, by the printer driver, the positional relationship between data output from the application software and a band output by the image output device, wherein data divided into bands is output to the image output device in accordance with the positional relationship detected in the positional relationship determination step.

19. A computer executable program stored on a computer readable medium according to claim 18, wherein when the application software outputs one page of data part by part in the same order as the order in which the data is printed on printing paper in a printing direction, the application software divides the one page of data into bands and outputs the data on a band-by-band basis.

20. A computer executable program stored on a computer readable medium according to claim 15, further comprising determining whether the information processing apparatus and the image output device are connected by USB 2.0.

21. A computer executable program stored on a computer readable medium according to claim 15, further comprising determining whether the print data is to be outputted on plain paper.

* * * * *